US007967924B2

(12) United States Patent
Groh et al.

(10) Patent No.: US 7,967,924 B2
(45) Date of Patent: Jun. 28, 2011

(54) METHOD FOR MAKING A COMPOSITIONALLY GRADED GAS TURBINE DISK

(75) Inventors: Jon Raymond Groh, Loveland, OH (US); Eric Allen Ott, Cincinnati, OH (US); Robert Edward Schafrik, Cincinnati, OH (US); Daniel Donald Krueger, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1368 days.

(21) Appl. No.: 11/130,764

(22) Filed: May 17, 2005

(65) Prior Publication Data
US 2006/0260126 A1 Nov. 23, 2006

(51) Int. Cl.
*B23P 15/04* (2006.01)
(52) U.S. Cl. .......................... 148/410; 29/889.2
(58) Field of Classification Search ............... 29/889.1; 148/410
See application file for complete search history.

(56) References Cited

U.S. PATENT DOCUMENTS

| 4,851,190 A | 7/1989 | Bowen et al. |
| 4,900,635 A | 2/1990 | Bowen et al. |
| 5,038,014 A | 8/1991 | Pratt et al. |
| 5,077,090 A | 12/1991 | Sawyer |
| 5,161,950 A * | 11/1992 | Krueger et al. ........... 416/204 R |
| 5,302,414 A | 4/1994 | Alkhimov et al. |
| 5,795,626 A | 8/1998 | Gabel et al. |
| 6,375,877 B2 | 4/2002 | Lauf et al. |
| 6,887,529 B2 * | 5/2005 | Borneman et al. ............ 427/448 |

OTHER PUBLICATIONS

J.F.Durodola, O.Attia, "Deformation and stresses in functionally graded rotating disks", Composites Science and Technology 60 (2000), pp. 987-995.*
Nishino et al, Characteristic and applicability of various winding methods in centrifugal forming of composite materials, Journal of the Textile Machinery Society of Japan, vol. 31, No. 3 (1985), pp. 61-70.*
Maurice F. Amateau et al., "High-Velocity Particle Consolidation Technology," IMAST Quarterly 2000, No. 2, pp. 3-6 (2000).
Howard Gabel, "Kinetic Metallization Compared with HVOF", Advanced Materials and Processes, 7 pages (May 2004).

* cited by examiner

*Primary Examiner* — Roy King
*Assistant Examiner* — Jie Yang
(74) *Attorney, Agent, or Firm* — McNees Wallace & Nurick LLC

(57) ABSTRACT

A compositionally graded gas turbine disk is made by preparing a rotationally symmetric radially inner segment of a gas turbine disk preform, rotating the inner segment about a central axis, spray applying a radially outer-segment material onto the radially inner segment as it rotates about the central axis, preferably achieving a gradual transition in composition, and thereafter further processing the gas turbine disk preform to produce the compositionally graded gas turbine disk.

20 Claims, 2 Drawing Sheets

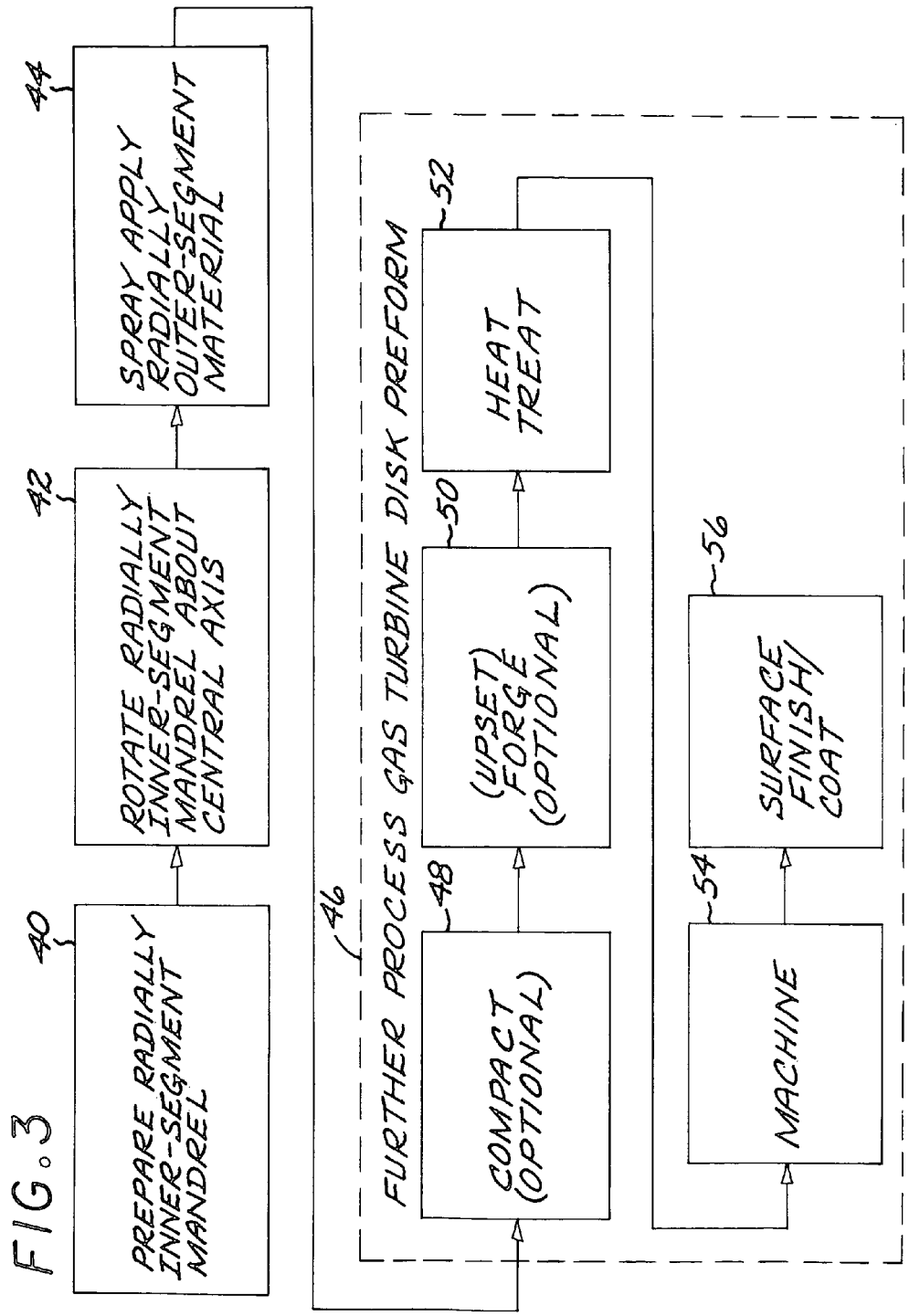

METHOD FOR MAKING A COMPOSITIONALLY GRADED GAS TURBINE DISK

This invention relates to the making of a gas turbine disk and, more particularly, a gas turbine disk having a composition that varies radially with position in the gas turbine disk.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor and to the fan. In a more complex version of the gas turbine engine, the compressor and a high pressure turbine are mounted on one shaft, and the fan and a low pressure turbine are mounted on a separate shaft. The hot exhaust gases flow from the back of the engine, driving it and the aircraft forward.

The turbine blades, compressor blades, and fan blades are mounted on, or extend from, respective gas turbine disks. The gas turbine disks rotate at a high rate on their shaft or shafts. During service, the various parts of the gas turbine disks are subjected to different conditions of loadings and temperatures. For example, the high-pressure and low-pressure turbine disks, upon which the turbine blades are mounted, experience low-cycle-fatigue loadings and high tensile stress at relatively lower temperatures near their bores, and high tensile stress and creep loadings at relatively higher temperatures near their rims.

The turbine disks are made of nickel-base superalloys, but no single nickel-base superalloy having a single grain size and heat-treatment state provides optimum performance under these different conditions. Various techniques have been proposed for varying the properties of the turbine disk as a function of radial position. For example, it has been suggested to vary the composition of the alloy as a function of radial position, and/or to vary the heat treat temperatures as a function of radial position to vary the grain size and mechanical properties.

There remains a need for a practical approach to making the turbine disks utilizing these principles, and the present invention fulfills this need.

SUMMARY OF THE INVENTION

The present approach provides a method for making a turbine disk whose composition is graded radially and/or axially. The approach is compatible with existing production technology, so that it may readily be used in a production setting. The composition may be varied to achieve a wide range of structures and properties through either spatially uniform or spatially nonuniform heat treatments.

A method for making a compositionally graded gas turbine disk comprises first preparing a radially inner segment of a gas turbine disk preform, preferably by extrusion to a cylindrical billet. The radially inner segment is formed of a radially inner-segment material and is rotationally symmetric about a central axis. The inner segment is thereafter rotated about the central axis. A radially outer-segment material is spray applied onto the radially inner segment as it rotates about the central axis, to form a radially outer segment. The gas turbine disk preform is thereafter further processed to produce the compositionally graded gas turbine disk. The composition of the radially outer-segment material is different from the composition of the radially inner-segment material.

Preferably, a composition of the radially outer-segment material is substantially the same as a composition of the radially inner-segment material at an interface between the radially outer segment and the radially inner segment. That is, preferably there is no abrupt change in composition measured across the interface, so that there are minimal differential thermal strains and no crack-initiation sites at the interface during service. The composition of the radially outer-segment material is thereafter gradually changed with increasing distance from the interface by changing the composition of the spray feed material, to produce the different composition that is desired in the radially outer segment.

The step of spray applying may be accomplished by any operable approach. Cold spraying is preferred, and HVOF, HVPC, laser additive, and cathodic arc transfer are examples of other operable processes. The spray application approach is highly flexible as to the composition distribution and gradation that are produced in the radially outer segment. A composition of the radially outer-segment material may be substantially constant with distance from the central axis, except at the transition at the interface, and with location along the central axis. The composition of the radially outer-segment material may vary radially and/or axially. The composition of the radially outer-segment material may be a function only of radial distance from the central axis. The composition of the radially outer-segment material may be a function only of axial distance along the central axis. The composition of the radially outer-segment material may be a function of distance from the central axis and location along the central axis. The outer-segment material is produced by spraying solid powder or solid wire feed material, which may or may not be melted during the spraying operation.

The further processing includes all steps necessary to finish the turbine disk preform to the final turbine disk. Such processing typically includes compacting the gas turbine disk preform to densify the sprayed outer-segment material. It may also include upset forging the compacted gas turbine disk preform, and usually includes rough and final machining. There may also be other steps such as surface finishing and surface coating of the gas turbine disk preform.

As part of the further processing, there is preferably a heat treating of the gas turbine disk preform as may be appropriate for the materials chosen for the inner-segment material and the outer-segment material. In the preferred application of a turbine disk (as distinct from a compressor disk or a fan disk), the inner-segment material and the outer-segment material are chosen to be two different nickel-base superalloys. The inner-segment nickel-base superalloy is preferably selected to have superior low-cycle fatigue and tensile properties at moderate operating temperatures, after suitable heat treatment. The outer-segment superalloy is preferably selected to have superior creep and elevated-temperature tensile properties, after suitable heat treatment. Examples of suitable materials include Rene 104 or Rene 95 for the radially inner-segment material, and Rene 88 for the radially outer-segment material.

The heat treatment is preferably spatially uniform, as a spatially uniform heat treatment is less expensive than a controlled spatially varying heat treatment. Because of the different compositions of the radially inner-segment material and the radially outer-segment material, the use of a spatially uniform heat treatment leads to different properties in the radially inner segment and the radially outer segment. That is, the radially inner-segment material is selected to be of a first composition, and the radially outer-segment material is selected to be of a second composition (different from the first composition) such that the first composition and the second composition may both be effectively heat treated in a common heat-treatment sequence, desirably to produce different structures. The gas turbine disk preform is heat treated with the common heat-treatment sequence. The heat treatment may instead be spatially non-uniform. Such spatially non-uniform heat treatment may be accomplished, for example, by chilling the inner bore of the gas turbine disk preform while it is otherwise undergoing spatially uniform heat treatment.

In the case of the preferred nickel-base superalloys, for example, the inner-segment material may be Rene 104, having a high-temperature solvus at about 2110° F., and the outer-segment material may be Rene 88, having a high-temperature solvus at about 2035° F. A spatially uniform isothermal heat treatment in the range of 2035-2110° F. results in a subsolvus heat treatment of the Rene 104, producing a finer grain size preferred for low-cycle fatigue performance, and a supersolvus solution heat treatment of the Rene 88, producing a coarser grain size preferred for creep and high-temperature tensile strength. More preferably, the spatially uniform isothermal heat treatment is in the range of 2050-2080° F. to allow for internal variations in the furnace temperature and to provide a safety factor in the heat treatment. The heat treatment is then continued with a lower-temperature aging that produces a distribution of gamma prime precipitates in a gamma matrix of each composition.

One of the important advantages of the present approach is that the composition of the radially outer segment may be changed as a function of the radial or the axial position. The use of powder feed material permits the spray-deposited composition to be of a specific fixed standard alloy type, or to be graded in a manner that the resulting structure is not a specific fixed standard alloy type, or any intermediate combination. For example and preferably, the composition of the radially outer-segment material may be selected to be the same as or close to that of the radially inner-segment material at the interface where the radially outer-segment material is first applied to the radially inner segment to avoid an abrupt transition in the microstructure and in the physical and mechanical properties. The composition of the radially outer-segment material may thereafter be gradually changed to another composition or compositions with increasing radial distance from the radially inner segment.

The present approach provides a commercially practical approach to fabricating a gas turbine disk having a spatially varying composition. The compositions are selected to provide the optimum mechanical properties and microstructures responsive to the different performance requirements of the different regions of the gas turbine disk. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a block flow diagram of a method for making a gas turbine disk.

DETAILED DESCRIPTION OF THE INVENTION

Figure 1:
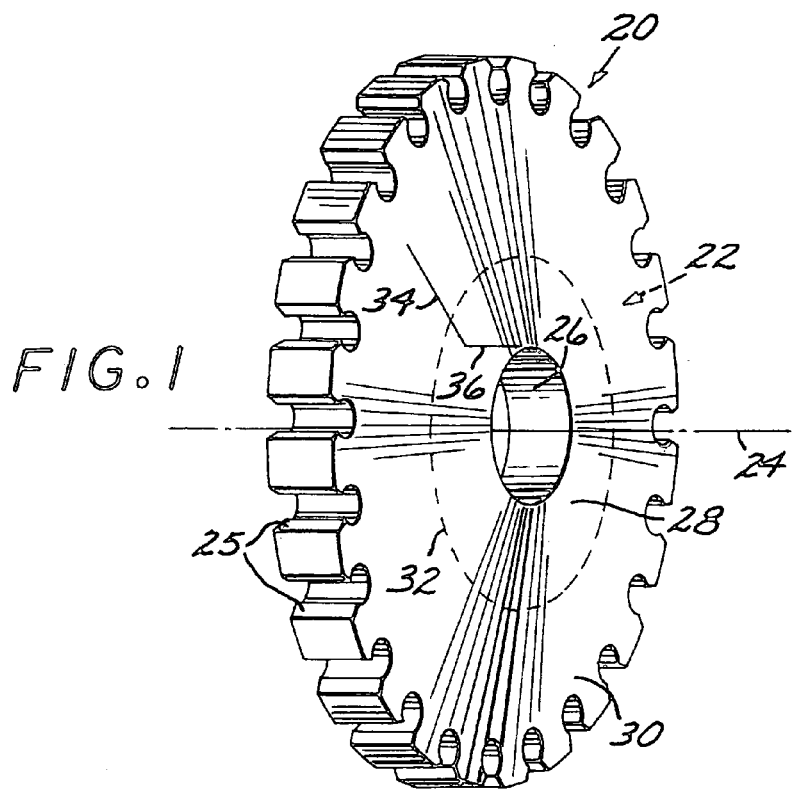
FIG. 1 is a perspective view of a gas turbine disk.

FIG. 1 depicts a gas turbine disk 20 for a gas turbine engine. The gas turbine disk 20 may be a turbine disk, a compressor disk, or a fan disk. The preferred application is a turbine disk, and the following discussion will focus on the turbine disk.

Figure 2:
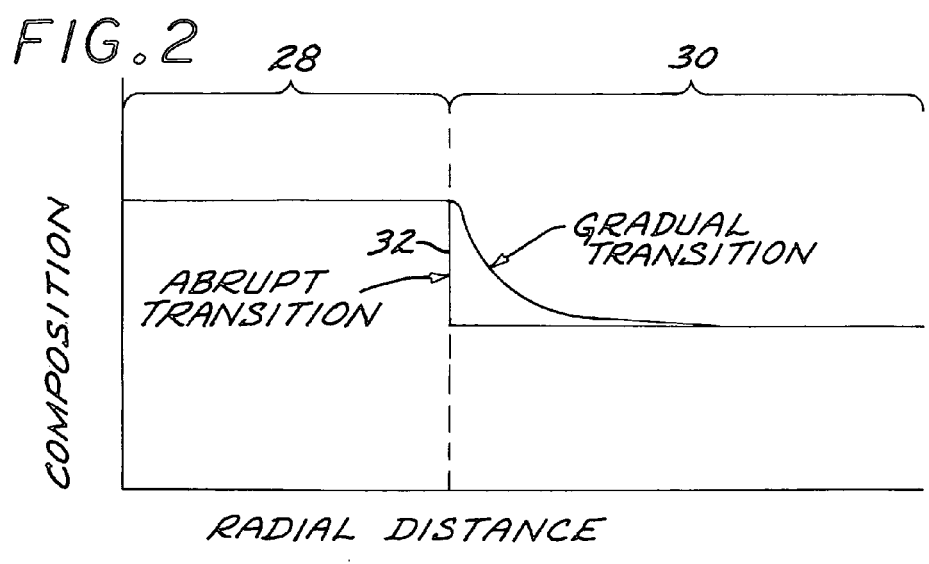
FIG. 2 is a schematic graph of composition as a function of distance.

The illustrated gas turbine disk 20 has a body 22 that is generally cylindrically symmetric about a central axis 24. The gas turbine disk 20 may have a hollow bore 26 at its radial center as illustrated, or it may be solid. (As used herein, "radial" refers to a radial direction 34 perpendicular to the central axis 24, and "axial" refers to an axial direction 36 parallel to the central axis 24.) The gas turbine disk 20 has slots 25 on its periphery (i.e., rim) into which the attachment portions of turbine blades (not shown) are received. For the purposes of the present discussion, the body 22 may be considered as including a radially (relative to the central axis 24) inner segment 28 and a radially outer segment 30 having a composition different from that of the radially inner segment 28. Such a gas turbine disk 20 is termed a "compositionally graded gas turbine disk". There is an interface 32 between the radially inner segment 28 and the radially outer segment 30. The interface 32 may be abrupt, but more preferably is gradual, that is spread over a radial distance to avoid thermal strains, crack-initiation sites, and other discontinuous characteristics associated with an abrupt compositional change. FIG. 2 schematically illustrates the preferred substantially identical composition at the interface 32 and radially outward gradual-transition composition change of the radially outer segment 30, as compared with an abrupt-transition composition change. Either approach may be prepared within the scope of the present approach, but the gradual transition is preferred. Thus, in the preferred gas turbine disk 20 according to the present approach, the radially inner segment 28 has a fixed composition, and the composition of the radially outer segment 30 gradually transitions to the desired composition of the radially outer segment 30. The slots 25 are machined into the radially outer segment 30 at the periphery of the gas turbine disk 20.

FIG. 3 depicts in block diagram form a method for making the compositionally graded gas turbine disk 20. The method includes first preparing a radially inner segment of a gas turbine disk preform, made of a radially inner-segment material, step 40. (The term "preform" is used to distinguish the gas turbine disk structure during production, as distinct from the final article depicted in FIG. 1.) The radially inner segment of the gas turbine disk preform generally corresponds to the radially inner segment 28 of the final gas turbine disk 20, although it is of a different shape at this stage of the manufacturing process. The radially inner segment of the gas turbine disk preform is rotationally symmetric about the central axis 25. The radially inner segment of the gas turbine disk preform may be made by any operable approach. In a presently preferred approach, the radially inner-segment material is made of atomized powder that is consolidated into a billet. The billet is then converted by thermomechanical processing, typically including elevated temperature extrusion, into the radially inner segment of the gas turbine disk preform. The radially inner segment of the gas turbine disk preform may instead be made by casting and converting or other operable approach.

The radially inner segment of the gas turbine disk preform is mounted into a suitable apparatus and rotated about the central axis 24, step 42, in a manner similar to the rotation of a workpiece in a lathe. The radially inner segment of the gas turbine disk preform serves as a deposition mandrel in the subsequent spray application step.

The radially outer-segment material is spray applied onto the radially inner segment of the gas turbine disk preform as it rotates about the central axis 24, step 44, to form a radially outer segment of the gas turbine disk preform. The radially outer segment of the gas turbine disk preform generally corresponds to the radially outer segment 30 of the final gas turbine disk 30, but it is of a different shape and thickness at this stage of processing. The radially outer segment of the gas turbine disk preform is generally cylindrically symmetric about the central axis 42, although there may be relatively small irregularities that are removed in subsequent processing.

The radially outer-segment material may be applied by any operable approach suitable to the material being applied and deposited. Examples of operable approaches include spray application by cold spray; high velocity oxyfuel (HVOF); high velocity particle consolidation (HVPC), such as disclosed in U.S. Pat. No. 5,302,414, whose disclosure is incorporated by reference, and Maurice F. Amateau et al., "High-Velocity Particle Consolidation Technology," *IMAST Quarterly* 2000, No. 2, pages 3-6 (2000); laser additive; or cathodic arc transfer processes. The preferred approach is cold spray by a method such as kinetic metallization, which is described, for example, in U.S. Pat. No. 5,795,626, whose disclosure is incorporated by reference, and Howard Gabel, "Kinetic Metallization Compared with HVOF, *Advanced Materials and Processes*, pages 47-48 (May 2004). Briefly, in the "cold spray" approach, prealloyed powder particles of the radially outer-segment material are sprayed at high velocity and at a relatively low processing temperature onto the surface of the rotating radially inner-segment mandrel. This approach is termed "cold spray" because its low processing temperature is typically about 1200-1400° F. for the preferred nickel-base superalloy radially outer-segment material. This temperature is sufficiently low that the surfaces of the powder particles do not melt or significantly oxidize during the spray processing, producing oxides that would inhibit subsequent compaction and homogenization of the structure. The cold spray processing temperatures are also well below key metallurgical temperatures such as the gamma prime solvus of the radially inner segment 28, so that its microstructure is not altered during the application of the radially outer segment 30. This temperature is sufficiently high, however, that the powder particles deform to produce an undensified layer at the deposited surface, which undensified layer gradually thickens as the cold spray continues. The cold spray approach is distinct from operable but less preferred hot spray approaches such as HVOF, wherein the sprayed powder particles at least partially melt, leading to potential oxidation of their surfaces during the spray process.

The spray approach also permits a wide variety of different spatial composition variations in the radially outer segment. For example, the composition of the radially outer-segment material may be substantially constant with distance from the central axis 24 and with location along (i.e., parallel to) the central axis 24, the "abrupt transition" material of FIG. 2. The composition of the radially outer-segment material may instead change and be a function only of distance from the central axis 24, as in the "gradual transition" material of FIG. 2, which also features substantially identical compositions at the interface 32. In yet another variation, the composition of the radially outer-segment material may change and be a function of the distance from the central axis 24 and also the location along the central axis 24. Complex patterns of composition may be utilized if desired, so that, for example, the composition in the region of the slots 25 is different from that of the other regions.

After the radially outer-segment material has been spray applied in step 44, the gas turbine disk preform may be, and typically is, further processed to produce the compositionally graded gas turbine disk, step 46. Some of the more important and commonly used types of further processing 46 are illustrated in FIG. 3. The further processing optionally includes compacting the gas turbine disk preform, step 48. This compacting 48 is normally required because the spray-applied radially outer-segment material may have voids therein, which are closed to achieve a fully dense product in the compaction step 48. The compaction 48 may be accomplished by any operable approach. The preferred approaches include placing the gas turbine disk preform into a metallic can and then processing by hot isostatic pressing, extrusion, or both. The compaction 48 is preferably but optionally followed by further forging, such as upset forging 50, of the gas turbine disk preform.

The gas turbine disk preform may be, and usually is, heat treated, step 52. The heat treatment achieves the desired combination of grain structure and dispersed phase structure within the material. In one approach, the heat treatment 52 is spatially non-uniform. To achieve a spatially non-uniform heat treatment, the gas turbine disk preform may be heated nonuniformly, as with induction elements or heat lamps, or it may be heated uniformly and locally cooled nonuniformly, as with chill blocks or gas currents positioned to achieve local cooling. A combination of these techniques may be used as desired.

On the other hand, the production of spatially non-uniform heat treatments is complex, and it is preferable to use a spatially uniform heat treatment. In one approach, the radially inner-segment material is of a first composition, such as a first nickel-base superalloy. The radially outer-segment material is of a second composition different from the first composition, such as a second nickel-base superalloy. The selection of the compositions is made such that the first composition and the second composition may both be effectively heat treated in a common heat-treatment sequence in which the temperatures are uniform throughout the gas turbine disk, but achieve different final properties of the two compositions due to the different compositions. As used herein, a "common heat-treatment sequence" means that the radially inner segment 28 and the radially outer segment 30 are subjected to the same heat treatment temperature-time profile (within the limitations of thermal diffusion through thick sections).

In an example, the inner-segment material is Rene 104, having a high-temperature solvus at about 2110° F., and the outer-segment material is Rene 88, having a high-temperature solvus at about 2035° F. Rene 104 has a nominal composition, in weight percent, of 20.6 percent cobalt, 13.0 percent chromium, 3.4 percent aluminum, 3.70 percent titanium, 2.4 percent tantalum, 0.90 percent niobium, 2.10 percent tungsten, 3.80 percent molybdenum, 0.05 percent carbon, 0.025 percent boron, 0.05 percent zirconium, up to 0.5 percent iron, balance nickel and minor impurity elements. An alternative to Rene 104 is Rene' 95, which has a nominal composition, in weight percent, of about 13 percent chromium, about 8 percent cobalt, about 3.5 percent molybdenum, about 3.5 percent tungsten, about 3.5 percent niobium, about 2.5 percent titanium, about 3.5 percent aluminum, about 0.01 percent boron, about 0.05 percent zirconium, about 0.06 percent carbon, balance nickel and incidental impurities. Rene 88 has a nominal composition, in weight percent, of 13 percent cobalt, 16 percent chromium, 4 percent molybdenum, 3.7 percent titanium, 2.1 percent aluminum, 4 percent tungsten, 0.75 percent niobium, 0.02 percent boron, 0.04 percent zirconium, and 0.04 percent carbon, balance nickel and minor impurity elements. A spatially uniform isothermal heat treatment in the preferred range of 2050-2080° F. results in subsolvus heat treatment of the Rene 104, producing a finer grain size preferred for good low-cycle fatigue performance and good tensile strength at moderate temperatures, and a supersolvus solution heat treatment of the Rene 88, producing a coarser grain size preferred for good creep and high-temperature tensile strength. The heat treatment 52 is continued with a controlled quench and a lower-temperature age that produces a distribution of gamma prime precipitates in a gamma matrix of each composition.

The further processing 46 also typically includes rough and final machining, step 54, to define the general surface shape of the final gas turbine disk 20, and also to form specific features such as the bore 26, where present, and the peripheral axial slots 25.

Surface finishing and/or coating 56 may also be employed. Examples include working the surface as by shot peening, and applying protective surface coatings such as those known in the art.

In the further processing 46, the illustrated steps may be performed in any operable sequence, or there may be an intermixing of the steps. Upset forging 50 normally follows compaction 48. However, the heat treat step 52 may occur after forging 50, interspersed with the substeps of the forging operation 50, or after machining 54, interspersed with the substeps of the machining operation 54, or in any other operable sequence. Machining 54 may occur at whatever point of the processing that it is needed. The surface finishing 56 normally occurs at or near the end of the further processing 46.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for making a compositionally graded gas turbine disk, comprising the steps of
    preparing a radially inner segment of a gas turbine disk preform, wherein the radially inner segment is formed of a radially inner-segment material, and wherein the radially inner segment is rotationally symmetric about a central axis; thereafter
    rotating the radially inner segment about the central axis;
    spray applying a radially outer-segment material onto the radially inner segment as it rotates about the central axis, to form a radially outer segment; and thereafter
    further processing the gas turbine disk preform to produce the compositionally graded gas turbine disk.

2. The method of claim 1, wherein the step of preparing includes the step of preparing the radially inner segment by extrusion.

3. The method of claim 1, wherein the step of spray applying includes the step of
    spray applying the radially outer-segment material so that a composition of the radially outer-segment material is substantially the same as a composition of the radially inner-segment material at an interface between the radially outer segment and the radially inner segment, and wherein the composition of the radially outer-segment material varies with increasing distance from the interface.

4. The method of claim 1, wherein the step of spray applying includes the step of
    spray applying the radially outer-segment material so that a composition of the radially outer-segment material is substantially constant with distance from the central axis and with location along the central axis.

5. The method of claim 1, wherein the step of spray applying includes the step of
    spray applying the radially outer-segment material so that a composition of the radially outer-segment material is a function only of distance from the central axis.

6. The method of claim 1, wherein the step of spray applying includes the step of
    spray applying the radially outer-segment material so that a composition of the radially outer-segment material is a function of distance from the central axis and location along the central axis.

7. The method of claim 1, wherein the step of spray applying includes the step of
    spraying applying a wire or powder feed of the radially outer-segment material.

8. The method of claim 1, wherein the step of spray applying includes the step of
    spray applying by a cold spray, an HVOF, an HVPC, a laser additive, or a cathodic arc transfer process.

9. The method of claim 1, wherein the step of further processing includes the step of
    compacting the gas turbine disk preform.

10. The method of claim 1, wherein the step of further processing includes the step of
    compacting the gas turbine disk preform, and thereafter upset forging the gas turbine disk preform.

11. The method of claim 1, wherein the step of further processing includes the step of
    heat treating the gas turbine disk preform with a spatially non-uniform heat treatment.

12. The method of claim 1, including the additional steps of
    selecting the radially inner-segment material to be of a first composition,
    selecting the radially outer-segment material to be of a second composition such that the first composition and the second composition may both be effectively heat treated in a common spatially uniform heat-treatment sequence, and
    heat treating the gas turbine disk preform with the common spatially uniform heat-treatment sequence.

13. The method of claim 1, including the additional steps of
    selecting the radially inner-segment material to be of a first nickel-base superalloy composition,
    selecting the radially outer-segment material to be of a second nickel-base superalloy composition such that the first nickel-base superalloy composition and the second nickel-base superalloy composition may both be effectively heat treated in a common heat-treatment sequence, and
    heat treating the gas turbine disk preform with the common heat-treatment sequence.

14. A method for making a compositionally graded gas turbine disk, comprising the steps of
    preparing a radially inner segment of a gas turbine disk preform, wherein the radially inner segment is formed of a radially inner-segment nickel-base superalloy material, and wherein the radially inner segment is rotationally symmetric about a central axis; thereafter
    rotating the radially inner segment about the central axis;
    spray applying a radially outer-segment material onto the radially inner segment, as it rotates about the central axis, to form a radially outer segment, wherein a composition of the radially outer-segment material is substantially the same as a composition of the radially inner-segment material at an interface between the radially outer segment and the radially inner segment, and wherein the composition of the radially outer-segment material varies with increasing distance from the interface; and thereafter further processing the gas turbine disk preform to produce the compositionally graded gas turbine disk, wherein the step of further processing includes the steps of compacting the gas turbine disk preform, thereafter upset forging the gas turbine disk preform, and thereafter heat treating the gas turbine disk preform.

15. The method of claim 14, wherein the step of spray applying includes the step of
spray applying the radially outer-segment material so that a composition of the radially outer-segment material is substantially constant with distance from the central axis and with location along the central axis.

16. The method of claim 14, wherein the step of spray applying includes the step of
spray applying the radially outer-segment material so that a composition of the radially outer-segment material is a function only of distance from the central axis.

17. The method of claim 14, wherein the step of spray applying includes the step of
spray applying the radially outer-segment material so that a composition of the radially outer-segment material is a function of distance from the central axis and location along the central axis.

18. The method of claim 14, wherein the step of spray applying includes the step of
spray applying by a cold spray, an HVOF, an HVPC, a laser additive, or a cathodic arc transfer process.

19. The method of claim 14, wherein the step of heat treating includes the step of
heat treating the gas turbine disk preform with a spatially non-uniform heat treatment.

20. The method of claim 14, wherein the method includes the further step of
selecting the radially outer segment nickel-base superalloy material such that the radially inner-segment nickel-base superalloy material and the radially outer-segment nickel-base superalloy material second composition may be effectively heat treated in a common spatially uniform heat-treatment sequence, and
heat treating the gas turbine disk preform with the common spatially uniform heat-treatment sequence.

* * * * *